(12) United States Patent
Boyer et al.

(10) Patent No.: US 10,895,370 B2
(45) Date of Patent: Jan. 19, 2021

(54) HANDS-FREE SUPPORT BOLT AND METHOD

(71) Applicant: LSI Industries, Inc., Cincinnati, OH (US)

(72) Inventors: John D. Boyer, Lebanon, OH (US); Brian D. Cranston, Loveland, OH (US)

(73) Assignee: LSI Industries, Inc., Cincinnati, OH (US)

( * ) Notice: Subject to any disclaimer, the term of this patent is extended or adjusted under 35 U.S.C. 154(b) by 192 days.

(21) Appl. No.: 15/678,567

(22) Filed: Aug. 16, 2017

(65) Prior Publication Data

US 2019/0056093 A1 Feb. 21, 2019

(51) Int. Cl.
*F21V 21/116* (2006.01)
*F16B 41/00* (2006.01)
*F16B 43/00* (2006.01)

(52) U.S. Cl.
CPC .......... *F21V 21/116* (2013.01); *F16B 41/002* (2013.01); *F16B 43/00* (2013.01)

(58) Field of Classification Search
CPC ...................... F16B 2013/10; F16B 2013/105; F16B 13/04; F16B 13/0808; F16B 41/00; F16B 41/002; F21V 21/116
USPC .................................................. 411/340, 345
See application file for complete search history.

(56) References Cited

U.S. PATENT DOCUMENTS

| 127,934 | A | * | 6/1872 | Stone ................... | F16B 13/0808 411/340 |
|---|---|---|---|---|---|
| 231,334 | A | * | 8/1880 | Kraus ................. | F16B 13/0808 411/340 |
| 608,717 | A | * | 8/1898 | Russell ............... | F16B 13/0808 411/340 |
| 624,969 | A | * | 5/1899 | Peterson ............. | F16B 13/0808 411/340 |
| 644,115 | A | * | 2/1900 | Bennett ............... | F16B 13/0808 411/344 |
| 1,075,759 | A | * | 10/1913 | Burridge ............. | F16B 13/0808 411/345 |
| 1,145,423 | A | * | 7/1915 | Joseph ................ | F16B 13/0808 411/340 |
| 1,159,420 | A | * | 11/1915 | Rubly ................. | F16B 13/0808 411/340 |
| 1,340,470 | A | * | 5/1920 | Whitmore ........... | F16B 13/0808 411/345 |
| 1,346,578 | A | * | 7/1920 | Windsor ............. | F16B 13/0808 411/340 |

(Continued)

FOREIGN PATENT DOCUMENTS

GB 552100 A * 3/1943 .......... F16B 13/0808

*Primary Examiner* — Josh Skroupa
(74) *Attorney, Agent, or Firm* — Wood Herron & Evans LLP

(57) ABSTRACT

A mounting system includes a support including a threaded rod and a fixture including an aperture configured to be positioned over the threaded rod. The system also includes a catch bar coupled to the threaded rod and moveable relative to the threaded rod between a first position wherein the catch bar permits the aperture to be positioned over the threaded rod, and a second position wherein the catch bar extends at least partially radially outwardly from the threaded rod to thereby retain the fixture on the threaded rod.

11 Claims, 13 Drawing Sheets

(56) References Cited

U.S. PATENT DOCUMENTS

| | | | | |
|---|---|---|---|---|
| 1,404,914 A * | 1/1922 | Winkle | B25B 31/005 | 411/340 |
| 1,410,042 A * | 3/1922 | Watt | F16B 13/0808 | 411/340 |
| 1,433,410 A * | 10/1922 | Passauer | F16B 39/04 | 411/207 |
| 1,516,347 A * | 11/1924 | Pataky | F16B 13/0808 | 411/340 |
| 1,595,213 A * | 8/1926 | Neubauer | F16B 39/06 | 411/207 |
| 1,659,992 A * | 2/1928 | Crone | F16B 21/125 | 411/342 |
| 1,939,983 A * | 12/1933 | Karitzky | F16B 13/0808 | 411/346 |
| 1,963,514 A * | 6/1934 | Wherren | E04G 17/0658 | 249/42 |
| 2,072,066 A * | 2/1937 | Cossentine | F16B 13/0808 | 411/344 |
| 2,132,284 A * | 10/1938 | Bonham | F16B 13/0808 | 411/342 |
| 2,360,395 A * | 10/1944 | Byron | B67D 3/04 | 411/340 |
| 2,504,325 A * | 4/1950 | Graver | F16B 13/0808 | 411/345 |
| 2,578,515 A * | 12/1951 | Crafton | F16B 13/0808 | 411/340 |
| 2,660,083 A * | 11/1953 | Tyson | F16B 13/0808 | 411/396 |
| 3,561,516 A * | 2/1971 | Reddy | F16B 21/088 | 411/347 |
| 3,673,910 A * | 7/1972 | Collister | F16B 13/0808 | 411/345 |
| 3,712,356 A * | 1/1973 | Petroshanoff | F16B 39/02 | 411/208 |
| 3,771,410 A * | 11/1973 | Swindt, II | F16B 5/01 | 411/338 |
| 3,861,268 A * | 1/1975 | Jaggers | F16B 21/10 | 411/340 |
| 4,043,087 A * | 8/1977 | Connors | E04G 11/28 | 52/127.3 |
| 4,074,941 A * | 2/1978 | Jablonski | F21V 21/116 | 403/260 |
| 4,112,992 A * | 9/1978 | Wing | F16B 39/04 | 411/190 |
| 4,285,377 A * | 8/1981 | Hart | F16B 39/04 | 411/106 |
| 5,215,418 A * | 6/1993 | Trainer | F16B 13/0808 | 411/169 |
| 5,507,611 A * | 4/1996 | Collister | F16B 13/0808 | 411/340 |
| 5,897,300 A * | 4/1999 | Luedtke | F04B 43/1253 | 411/345 |
| 5,904,462 A * | 5/1999 | Gonzalez | F16B 21/12 | 411/341 |
| 6,685,408 B1 * | 2/2004 | Fusco | F16B 13/0808 | 411/340 |
| 6,709,212 B1 * | 3/2004 | Lauchner | F16B 13/0808 | 411/342 |
| 7,316,534 B2 * | 1/2008 | Hohmann | B60D 1/02 | 24/609 |
| 8,112,855 B1 * | 2/2012 | Balliew | B25B 27/00 | 29/221.6 |
| 9,670,950 B2 * | 6/2017 | Anderson | F16B 35/005 | |
| 10,267,349 B2 * | 4/2019 | Apostolopoulos | F16B 37/12 | |
| 10,385,909 B2 * | 8/2019 | Kim | F16B 39/04 | |
| 2006/0182514 A1* | 8/2006 | Ito | F16B 5/02 | 411/340 |
| 2014/0154028 A1* | 6/2014 | Pei | F16B 13/0808 | 411/345 |
| 2018/0216647 A1* | 8/2018 | Garfield | F16B 13/04 | |

* cited by examiner

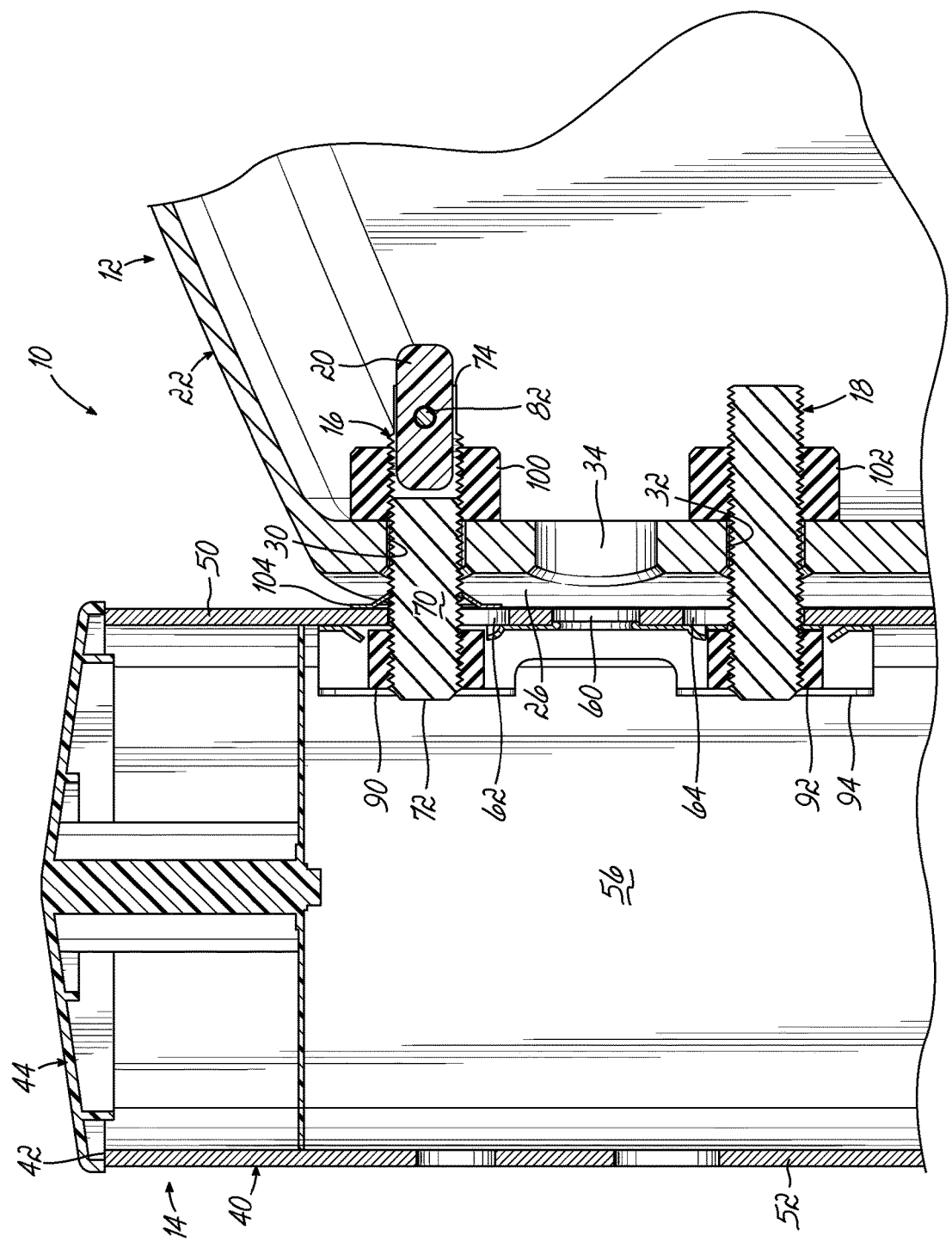

HANDS-FREE SUPPORT BOLT AND METHOD

TECHNICAL FIELD

The present invention relates to a support bolt and, more particularly, to a hands-free support bolt for supporting a fixture in position for mounting to a post and to a related method.

BACKGROUND

Objects, such as light fixtures, are commonly mounted to supports, such as posts, in order to install the object in a desired location. Mounting operations may require a number of installers working together, or may require a single installer to align the object to be mounted in an appropriate position for mounting, and then simultaneously hold the object in place while performing other tasks directed to coupling the object to the support, such as reaching for and/or handling tools, fasteners, and other objects. In cases where the object to be mounted is heavy, awkwardly shaped, or otherwise difficult to handle, this process may be unduly cumbersome and can result in the installer mishandling or dropping the object, which may cause damage to the components.

In an attempt to address this problem, some mounting operations include mounting an external bracket between a fixture and a post. The fixture may then be supported by the post, via the external bracket, while the installer performs other intermediary tasks to complete mounting of the fixture to the post. Thus, the external bracket may enable "hands-free" support of the fixture in position for mounting. However, this requires the installer (or manufacturer of the post) to perform the additional step of mounting the external bracket, thereby increasing the time and/or cost required to complete the mounting operation.

Thus, there is a need for improved systems and methods for providing hands-free support of an object in position for mounting to a support.

SUMMARY

In one embodiment, a mounting system includes a support including a threaded rod and a fixture including an aperture configured to be positioned over the threaded rod. The system also includes a catch bar coupled to the threaded rod and moveable relative to the threaded rod between a first position wherein the catch bar permits the aperture to be positioned over the threaded rod, and a second position wherein the catch bar extends at least partially radially outwardly from the threaded rod to thereby retain the fixture on the threaded rod. The catch bar may be pivotable relative to the threaded rod between a first orientation wherein the catch bar extends generally parallel to an axis of the threaded rod and a second orientation wherein the catch bar extends generally perpendicular to the axis of the threaded rod. In another embodiment, the catch bar may be resilient and may be expandable from a compressed state wherein the catch bar permits the aperture to be positioned over the threaded rod to an expanded state wherein the catch bar extends at least partially radially outwardly from the threaded rod.

In another embodiment, a method of mounting a fixture to a support includes aligning the fixture with the support, advancing an aperture of the fixture over a threaded rod of the support and actuating the threaded rod between a first configuration wherein the aperture can be received over the threaded rod, and a second configuration wherein the fixture is retained against movement off of the threaded rod prior to advancing a threaded fastener over the threaded rod. The method also includes advancing a threaded fastener over the threaded rod to secure the fixture to the support. Actuating the threaded rod may include pivoting a catch bar of the threaded rod from a first orientation wherein the catch bar extends generally parallel to an axis of the threaded rod toward a second orientation wherein the catch bar extends generally perpendicular to the axis of the threaded rod. In another embodiment, actuating the threaded rod comprises automatically expanding a catch bar of the threaded rod from a compressed state wherein the catch bar permits the aperture to be received over the threaded rod to an expanded state wherein the catch bar extends at least partially radially outwardly from the threaded rod.

These and other features and advantages of the present invention will be more readily understood in view of the drawings, which are described below.

BRIEF DESCRIPTION OF THE DRAWINGS

FIG. 4D is a cross sectional view similar to FIGS. 4A-4C, showing a fourth step of mounting the light fixture to the post.

DETAILED DESCRIPTION

Figure 1:
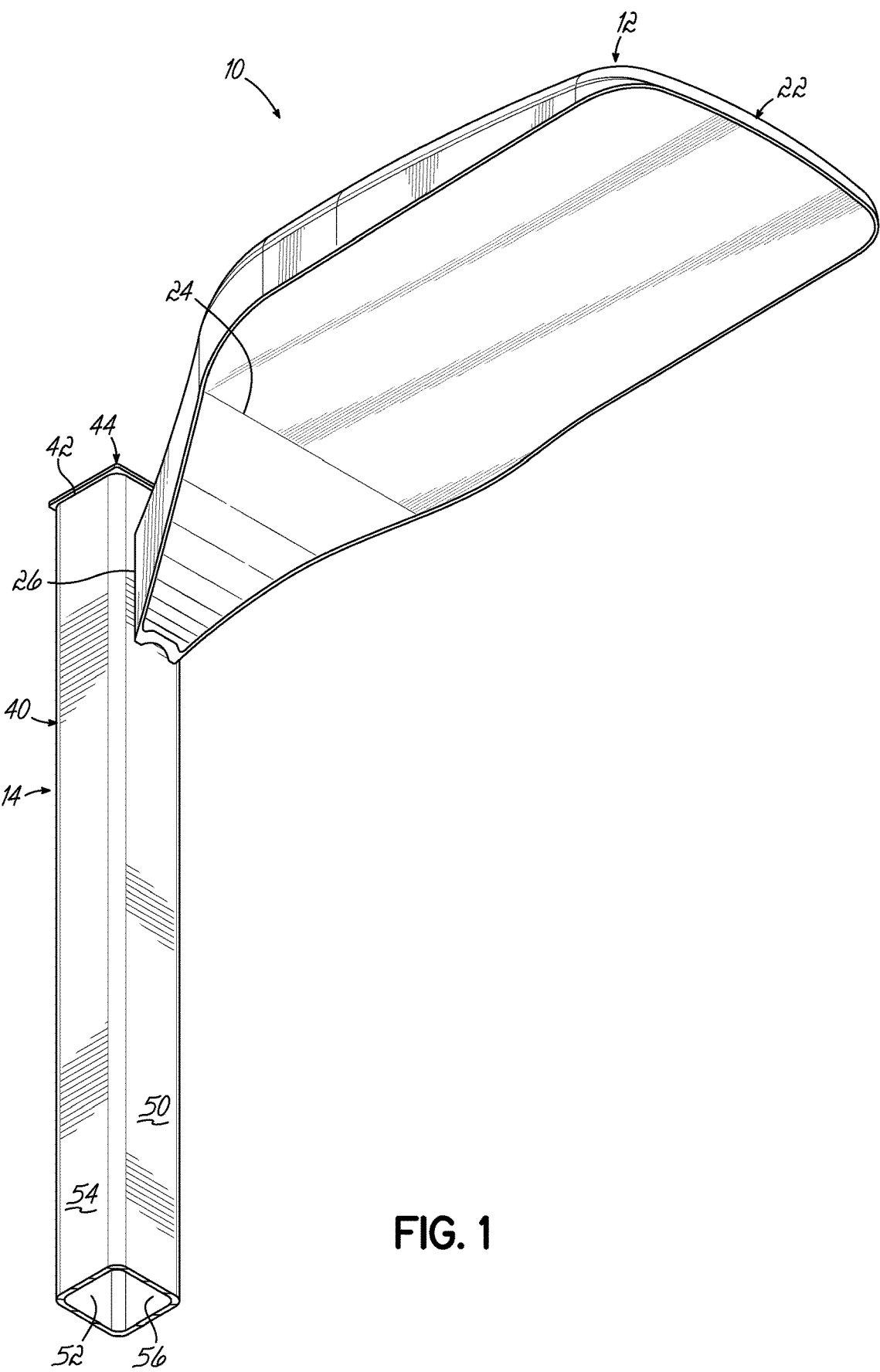
FIG. 1 is a perspective view of a light fixture mounted to a post including a hands-free support bolt in accordance with the principles of the present invention.
Figure 2:
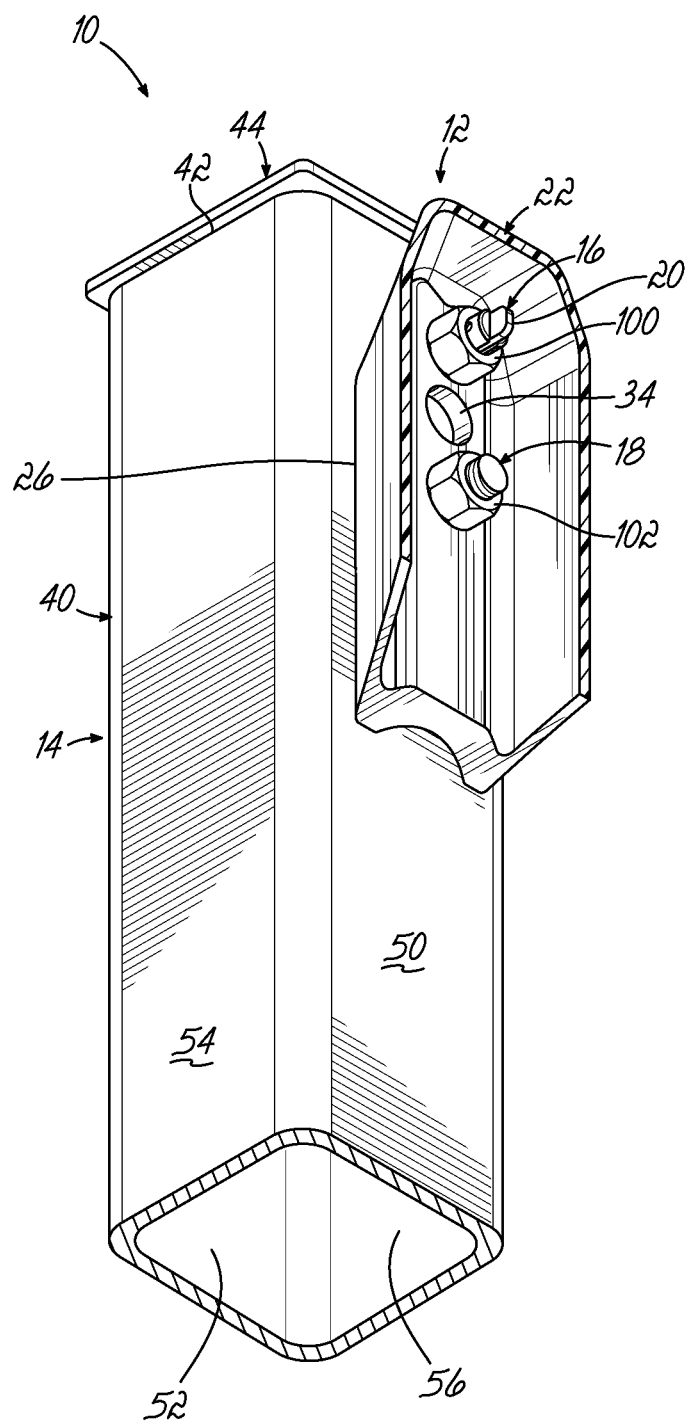
FIG. 2 is a cutaway perspective view of the assembly of FIG. 1, showing the mounting of the light fixture to the post via the hands-free support bolt and a second bolt.
Figure 3:
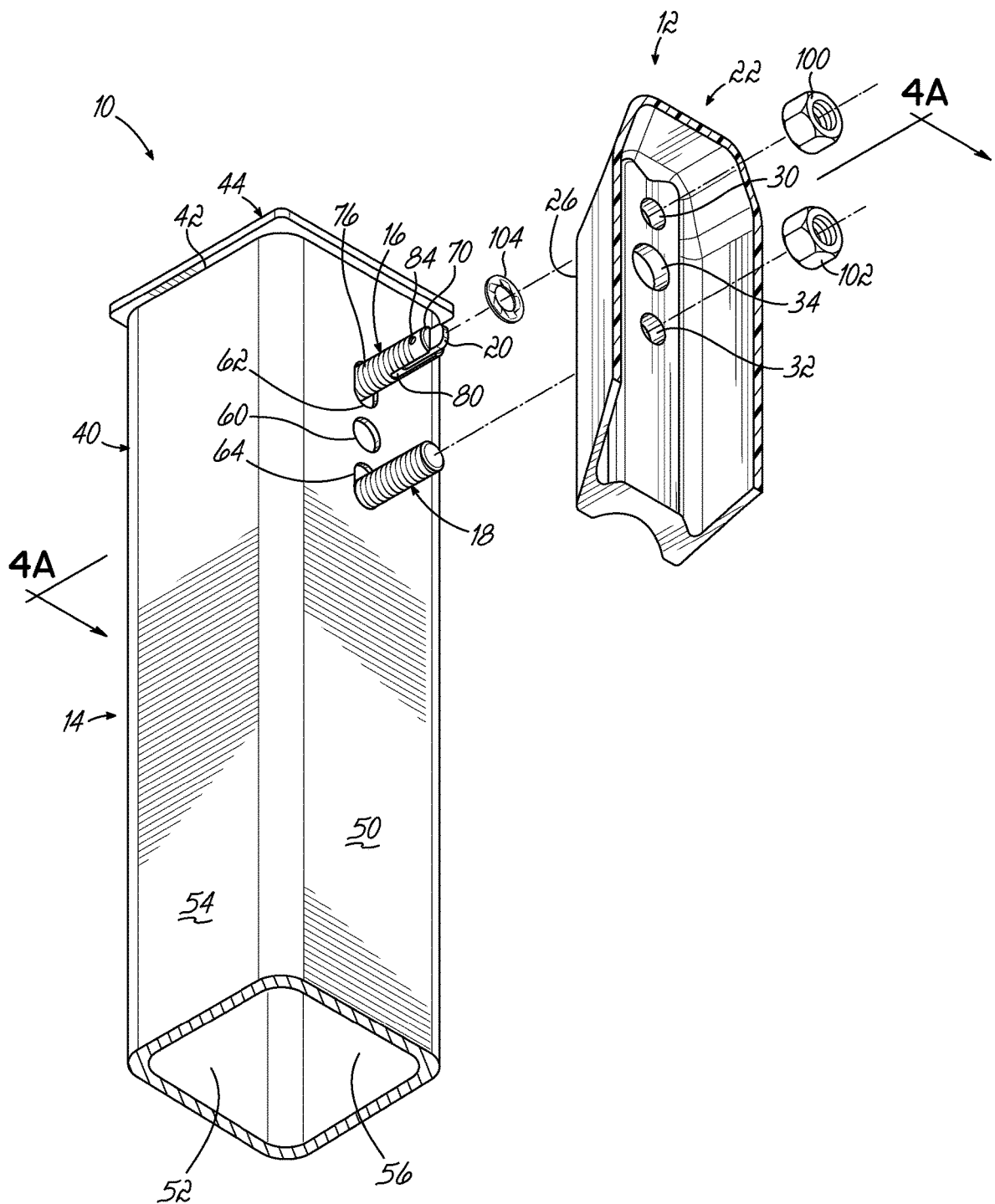
FIG. 3 is an exploded perspective view of the assembly as shown in FIG. 2.

Referring now to FIGS. 1-3, a lighting assembly 10 including a light fixture 12 mounted to a post 14 via an exemplary hands-free support bolt 16 and a second bolt 18 (e.g., a conventional bolt) is shown in accordance with one embodiment. As set forth in greater detail below, the support bolt 16 includes a moveable catch bar 20 for providing auxiliary support to at least temporarily retain the light fixture 12 on the support bolt 16. More particularly, the catch bar 20 of the support bolt 16 may prevent the fixture 12 from slipping off of the support bolt 16, and thus may relieve an installer of the need to manually support or steady the fixture 12 while simultaneously performing other tasks. In this manner, the fixture 12 may be fully supported by the post 14, via the support bolt 16, while the installer performs other intermediary tasks to complete a more permanent mounting of the fixture 12 to the post 14. Therefore, the support bolt 16 may enable hands-free support of the fixture 12 in position for mounting. The features of the support bolt 16 are set forth in further detail below to clarify each of these functional advantages and other benefits provided in this disclosure.

The illustrated light fixture 12 includes a housing 22 and a cover 24 removably attached to the housing 22 for concealing electrical cables or other components supplying electricity to a lighting element (not shown) mounted in the housing 22. The housing 22 includes a rear portion 26 configured to abut the post 14 when the light fixture 12 is mounted thereto. As shown, first and second bolt apertures 30, 32 are provided in the rear portion 26 for receiving the support bolt 16 and the second bolt 18, respectively. A cable aperture 34 is also provided in the rear portion 26 to allow the passage of electrical cables therethrough. It will be appreciated that the light fixture 12 may be configured in any suitable manner without departing from the scope of the invention.

The post 14 includes an elongate hollow body 40 extending from a bottom end (not shown) to a top end 42 and a cap 44 coupled to the hollow body 40 at the top end 42 for protecting the interior of the hollow body 40 from rain and/or other elements. As shown, the hollow body 40 is generally square-shaped in cross section, and includes a front wall 50, a rear wall 52, and first and second side walls 54, 56. A cable aperture 60 is provided in the front wall 50 for alignment with the cable aperture 34 of the fixture 12 to allow the passage of electrical cables into the interior of the hollow body 40 for electrically coupling the lighting element of the fixture 12 to an electrical grid for providing electricity to the lighting element. The support bolt 16 and second bolt 18 each extend from an exterior surface of the front wall 50 for alignment with the first and second bolt apertures 30, 32 of the fixture 12, respectively. In the embodiment shown, first and second elongate bolt apertures 62, 64 are provided in the front wall 50 for receiving the support bolt 16 and the second bolt 18, respectively. The first and second elongate bolt apertures 62, 64 may provide adjustability to the positions of the support bolt 16 and second bolt 18 relative to each other and/or relative to the first and second bolt apertures 30, 32 of the fixture 12.

Figure 4A:
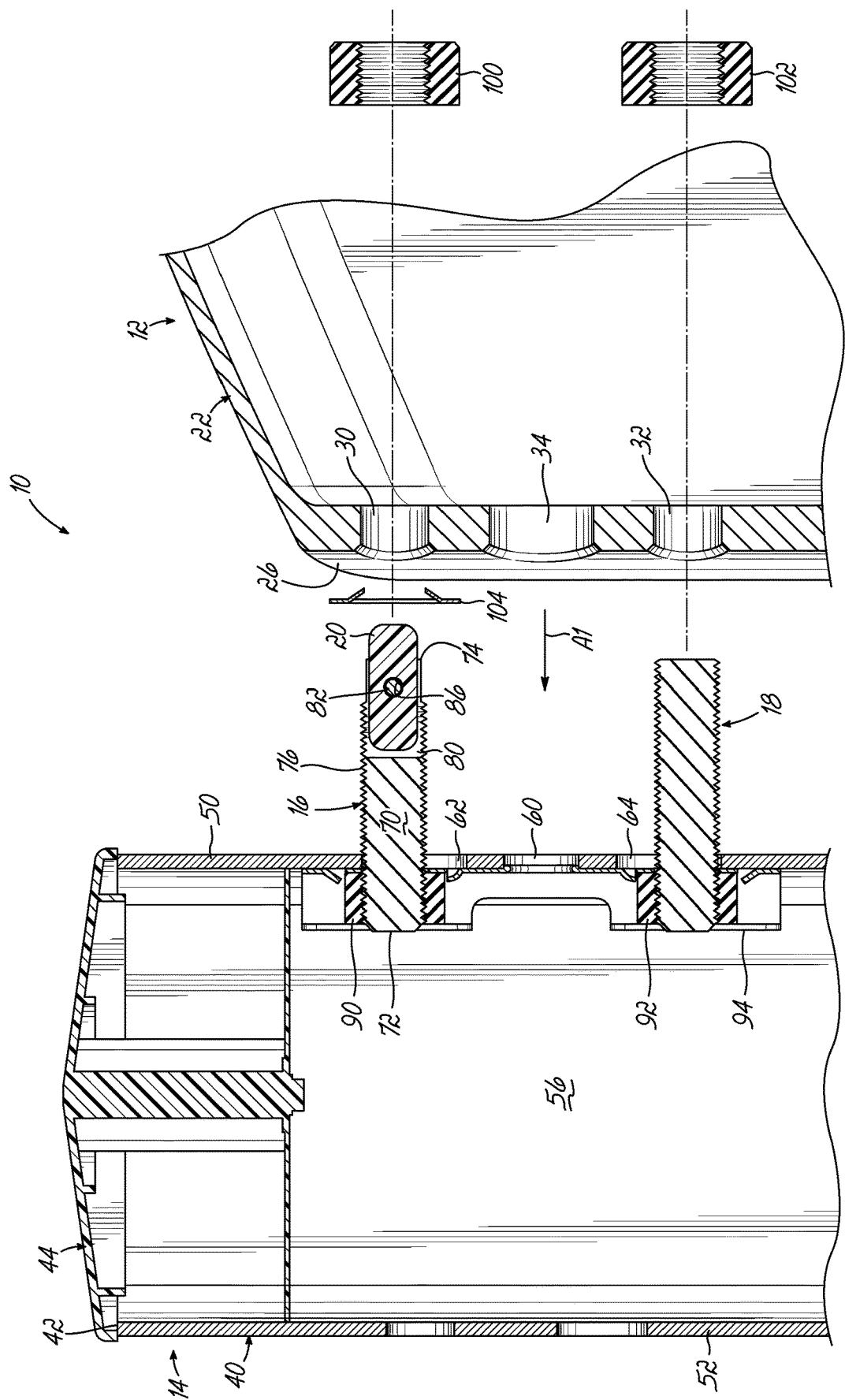
FIG. 4A is a cross sectional view of the assembly as shown in FIG. 3, taken along section line 4A-4A, showing a first step of mounting the light fixture to the post.

As shown, the support bolt 16 includes a threaded rod having a generally cylindrical body 70 extending along an axis between proximal and distal ends 72, 74, and a helical threading 76 provided on the outer surface of the body 70 (FIG. 4A). An elongate slot 80 extends into the body 70 from the distal end 74 toward the proximal end 72 for receiving the moveable catch bar 20. In the embodiment shown, the moveable catch bar 20 is pivotable. To that end, a pin 82 is inserted through aligned pin apertures 84, 86 in the outer surface of the body 70 adjacent the distal end 74 and in the catch bar 20 to thereby pivotably couple the catch bar 20 to the body 70. As shown, the catch bar 20 may have a thickness slightly less than the width of the elongate slot 80 such that the catch bar 20 may moveably fit therein, and may be generally rectangular in profile with a length greater than the height of the elongate slot 80 (e.g., the diameter of the body 70) and/or greater than the cross dimension of the first bolt aperture 30 and a height less than or approximately equal to the height of the elongate slot 80, for purposes which will be described more fully below.

In the embodiment shown, the support bolt 16 and second bolt 18 are each fixedly secured to the post 14. To that end, the support bolt 16 and second bolt 18 are threadably received by first and second threaded receiving nuts 90, 92 (FIG. 4A), respectively, which are fixedly secured to an interior surface of the front wall 50, and the support bolt 16 and second bolt 18 pass through the elongate bolt apertures 62, 64 to the exterior of the post 14 so as to extend from the exterior surface of the front wall 50. The receiving nuts 90, 92 may be fixedly secured to the front wall 50 in any suitable manner, such as via a bracket 94 and/or welding. Alternatively, the support bolt 16 and second bolt 18 may each include a head (not shown) positioned adjacent the interior surface of the front wall 50 in place of the illustrated receiving nuts 90, 92, and may be fixedly secured directly thereto or to the illustrated bracket 94, such as by welding. In other cases, the first and second elongate bolt apertures 62, 64 may be eliminated and the support bolt 16 and second bolt 18 may extend directly from an exterior surface of the front wall 50. It will be appreciated that the support bolt 16 and second bolt 18 may be secured to the post in a variety of different ways without departing from the scope of the invention.

In any event, first and second threaded nuts 100, 102 are threadably received over the support bolt 16 and second bolt 18, respectively, to clamp the rear portion 26 of the fixture 12 against the front wall 50 of the post 14, as shown in FIG. 2, to substantially permanently mount the fixture 12 to the post 14. One or more washers, such as a lock washer 104, may be positioned over either bolt, such as the support bolt 16, between the rear portion 26 of the fixture 12 and the front wall 50 of the post 14, as shown in FIG. 3.

Figure 4B:
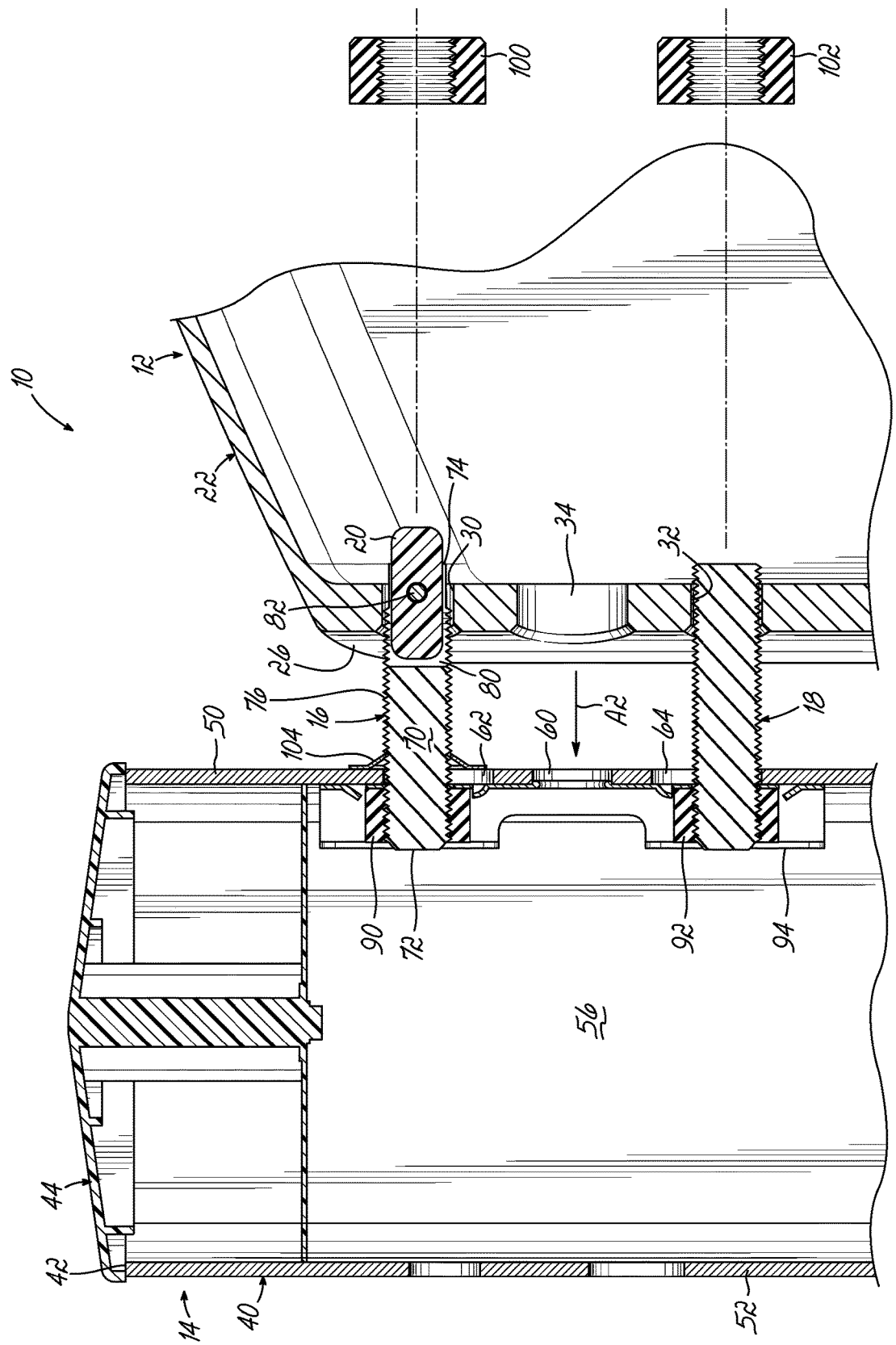
FIG. 4B is a cross sectional view similar to FIG. 4A, showing a second step of mounting the light fixture to the post.

With specific reference now to FIGS. 4A-4D, a method of mounting the fixture 12 to the post 14 with the support bolt 16 is described. Initially, the rear portion 26 of the fixture 12 may be advanced toward the front wall 50 of the post 14, as indicated by the arrow A1, with the first and second bolt apertures 30, 32 of the fixture 12 aligned with the support bolt 16 and second bolt 18 of the post 14, respectively, and with the catch bar 20 of the support bolt 16 radially within the support bolt 16 (FIG. 4A). To that end, the catch bar 20 is in a first orientation wherein the catch bar 20 extends generally parallel to the axis of the support bolt 16, so that the catch bar 20 is radially within the support bolt 16 by virtue of the height of the catch bar 20 being less than or equal to the height of the elongate slot 80. With the catch bar 20 in the first orientation, the lock washer 104 is advanced over the support bolt 16, and the fixture 12 is advanced toward the front wall 50 of the post 14, as indicated by the arrow A2, such that the support bolt 16 and second bolt 18 are received by the first and second bolt apertures 30, 32, respectively (FIG. 4B). Due to the catch bar 20 being radially within the support bolt 16, the catch bar 20 may avoid interfering with the advancement of the first bolt aperture 30 over the support bolt 16 toward the proximal end 72.

Figure 4C:
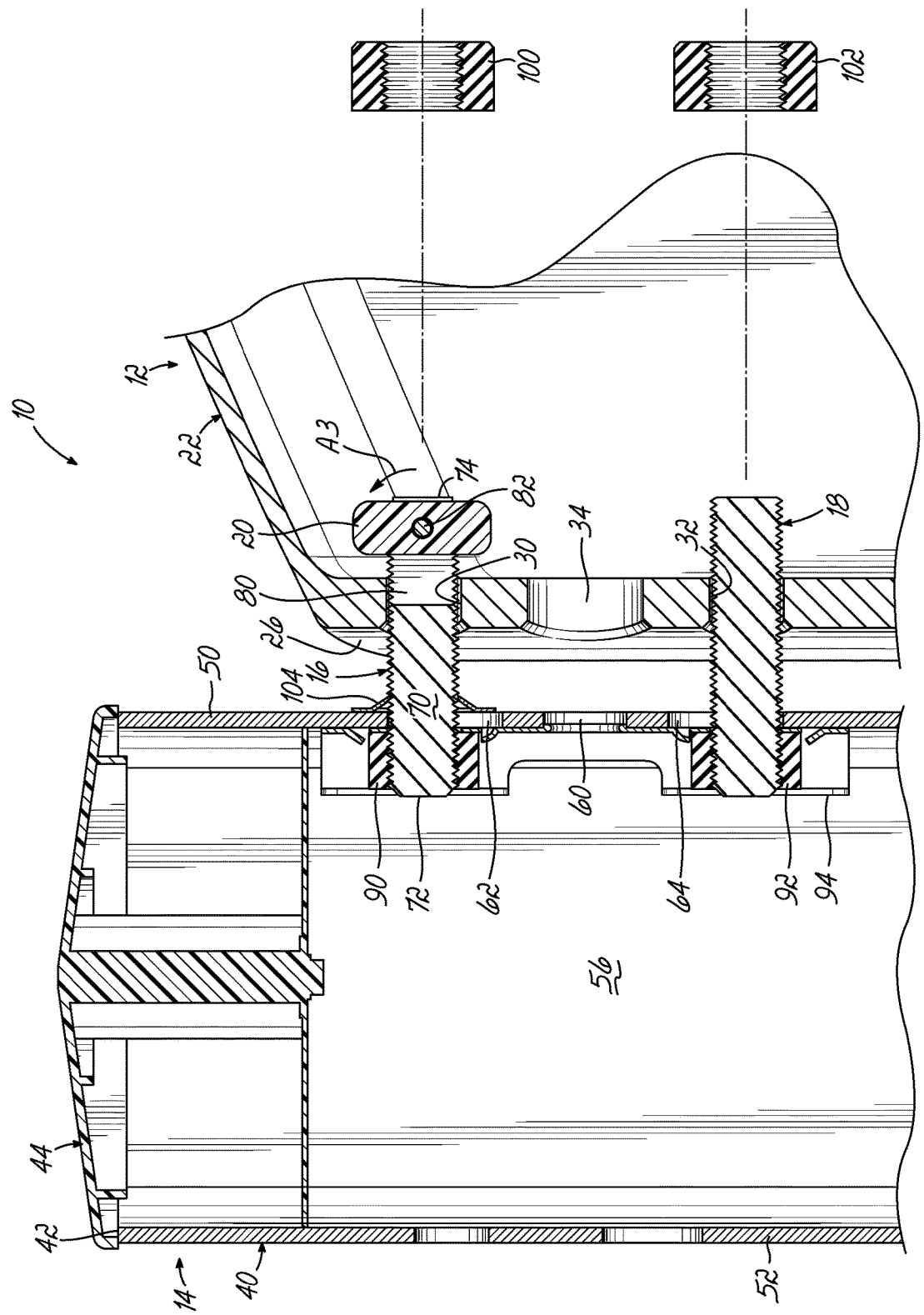
FIG. 4C is a cross sectional view similar to FIGS. 4A and 4B, showing a third step of mounting the light fixture to the post.

After the rear portion 26 of the fixture 12 has been sufficiently advanced along the bolts 16, 18 to clear the catch bar 20 and allow the catch bar 20 to freely pivot about the pin 82 without interference by the periphery of the first bolt aperture 30, the catch bar 20 is pivoted from the first orientation to a second orientation wherein the catch bar 20 extends at least partially radially outwardly from the support bolt 16 (FIG. 4C). For example, the catch bar 20 may be pivoted in a counterclockwise direction, as indicated by the arrow A3. As shown, in the second orientation the catch bar 20 extends generally perpendicular to the axis of the support bolt 16, so that the catch bar 20 extends radially outwardly from the support bolt 16 by virtue of the length of the catch bar 20 being greater than the height of the elongate slot 80. In addition, in the second orientation the catch bar 20 may provide a physical barrier to prevent the rear portion 26 from passing thereover and thereby retain the fixture 12 on the support bolt 16, by virtue of the length of the catch bar 20 being greater than the cross dimension of the first bolt aperture 30. It will be appreciated that the periphery of the first bolt aperture 30 and/or other surfaces of the rear portion 26 may be unable to accidentally pivot the catch bar 20 from the second orientation to the first orientation from a proximal side thereof. For example, if the rear portion 26 were to unintentionally move toward the distal end 74 of the support bolt 16, the catch bar 20 would abut the interior surface of the rear portion 26 and halt such movement. In this manner, the catch bar 20 may prevent the fixture 12 from slipping off of the support bolt 16, and may thus relieve the installer of the need to manually support or steady the fixture 12 in place while simultaneously performing other tasks.

With the catch bar 20 in the second orientation and the fixture 12 securely supported on the post 14 via the support bolt 16, the installer may freely use his or her hands to perform other intermediary tasks to complete a more permanent mounting of the fixture 12 to the post 14. For example, the installer may advance fasteners, such as the first and second nuts 100, 102, over the support bolt 16 and/or second bolt 18. In one embodiment, the second nut 102 may be advanced over the second bolt 18 prior to advancing the first nut 100 over the support bolt 16, so that the catch bar 20 may remain in the second orientation at least until the second nut 102 is secured to the second bolt 18 to thereby retain the fixture 12 on the second bolt 18. With the second nut 102 secured to the second bolt 18, the catch bar 20 may be pivoted about the pin 82 from the second orientation to the first orientation without compromising the support of the fixture 12 on the post 14. In the first orientation, the catch bar 20 may avoid interfering with the advancement of the first nut 100 over the support bolt 16. The first and second nuts 100, 102 may be tightened on the respective bolts 16, 18 to provide a rigid and secure attachment of the fixture 12 to the post 14 (FIG. 4D).

Figure 5:
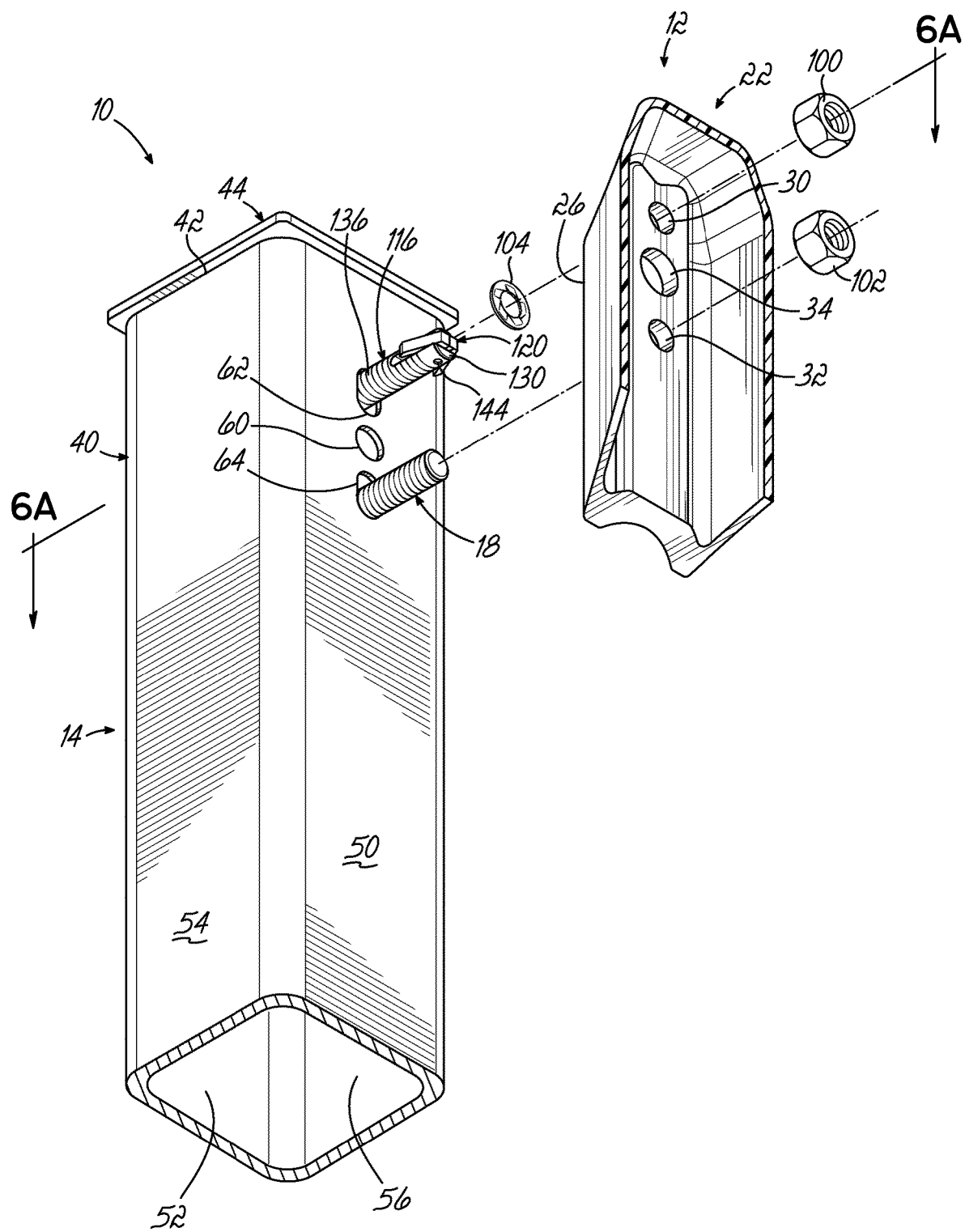
FIG. 5 is an exploded perspective view similar to FIG. 3, showing a light fixture mounted to a post including an alternative hands-free support bolt in accordance with the principles of the present invention.

Referring now to FIG. 5, an alternative exemplary support bolt 116 including a moveable catch bar 120 may be used in the lighting assembly 10. As shown, the support bolt 116 includes a threaded rod having a generally cylindrical body 130 extending along an axis between a proximal end 132 (FIG. 6E) and a distal end 134 (FIG. 6A), and a helical threading 136 provided on the outer surface of the body 130. An elongate slot 140 extends into the body 130 from the distal end 134 toward the proximal end 132 for receiving the moveable catch bar 120. In the embodiment shown, the moveable catch bar 120 is resilient, or expandable and compressible. To that end, a pin 142 is inserted through aligned pin apertures 144, 146 (FIG. 6A) in the outer surface of the body 130 adjacent the distal end 134 and in first and second arms 150, 152 of the catch bar 120 to thereby pivotably couple the first and second arms 150, 152 of the catch bar 120 to the body 130 such that the arms 150, 152 may pivot about the pin 142 relative to each other. As shown, the first and second arms 150, 152 each extend generally from the pin 142 toward the proximal end 132 of the support bolt 116 and terminate at respective tips 154, 156. Similar to the catch bar 20 described above, the catch bar 120 may have a thickness slightly less than the width of the elongate slot 140 such that the catch bar may 120 moveably fit therein.

Figure 6A:
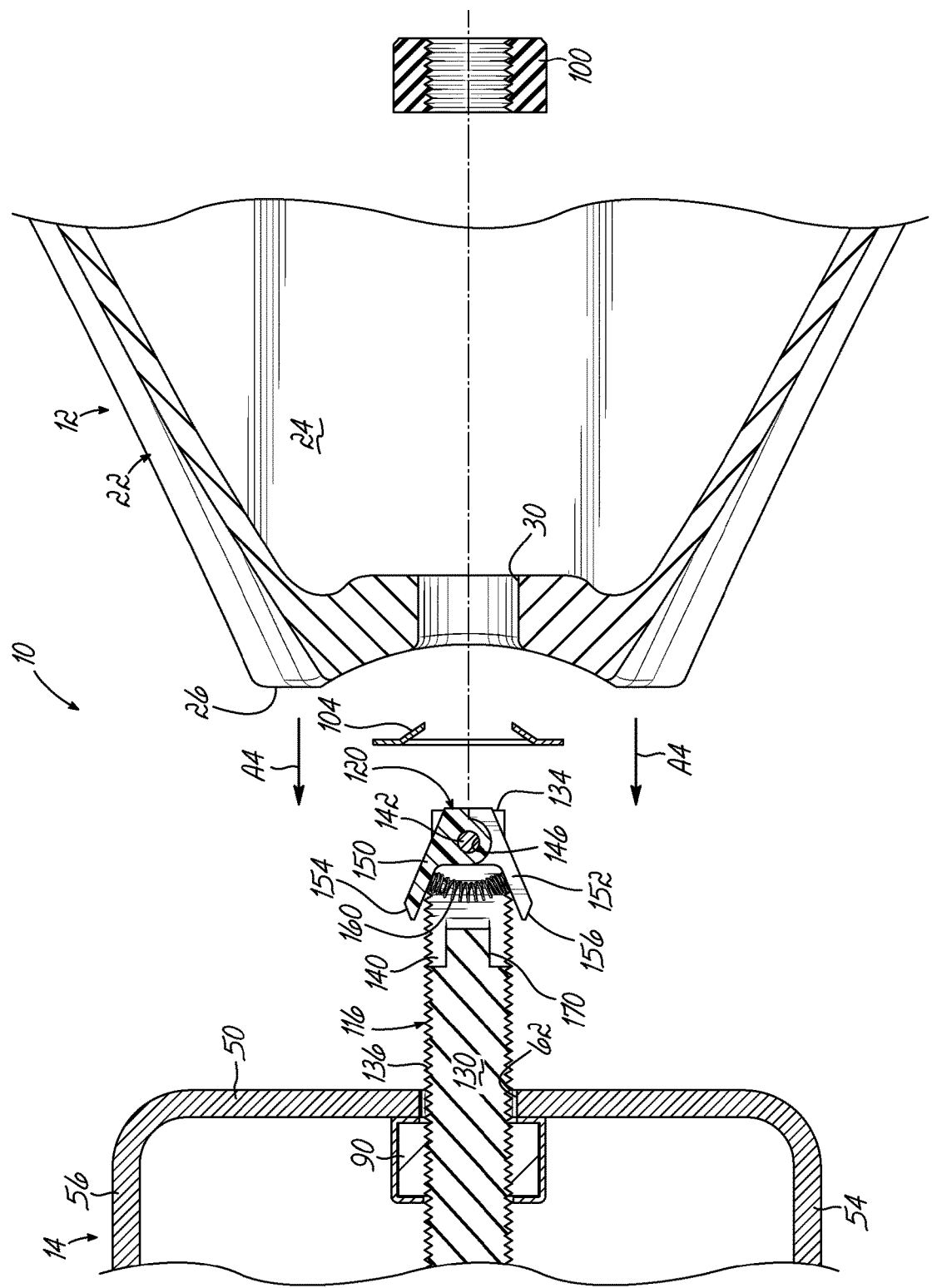
FIG. 6A is a cross sectional view of the assembly as shown in FIG. 5, taken along section line 6A-6A, showing a first step of mounting the light fixture to the post.

In the embodiment shown, a biasing member such as a spring 160 is positioned between the first and second arms 150, 152 to bias the tips 154, 156 of the first and second arms 150, 152 away from each other to define an expanded state of the catch bar 120 (FIG. 6A). When in the expanded state, the tips 154, 156 of the first and second arms 150, 152 may be separated by, or span, a distance greater than the height of the elongate slot 140 (e.g., the diameter of the body 130) and/or greater than the cross dimension of the first bolt aperture 30. Under a sufficient force to overcome the bias of the spring 160, the tips 154, 156 of the first and second arms 150, 152 may be moved toward each other to define a compressed state of the catch bar 120. When in the compressed state, the tips 154, 156 of the arms 150, 152 may span a distance less than or approximately equal to the height of the elongate slot 140 and/or less than or approximately equal to the cross dimension of the first bolt aperture 30. In the embodiment shown, an internal stop 170 is provided in the elongate slot 140 to limit the compression of the catch bar 120 (FIG. 6A). It will be appreciated that the catch bar 120 may be configured in a variety of different manners to provide resiliency from a compressed state to an expanded state without departing from the scope of the invention. For example, in an alternative embodiment a resilient catch bar may be constructed of a shape memory material biasing the catch bar toward an expanded state (not shown).

Figure 6B:
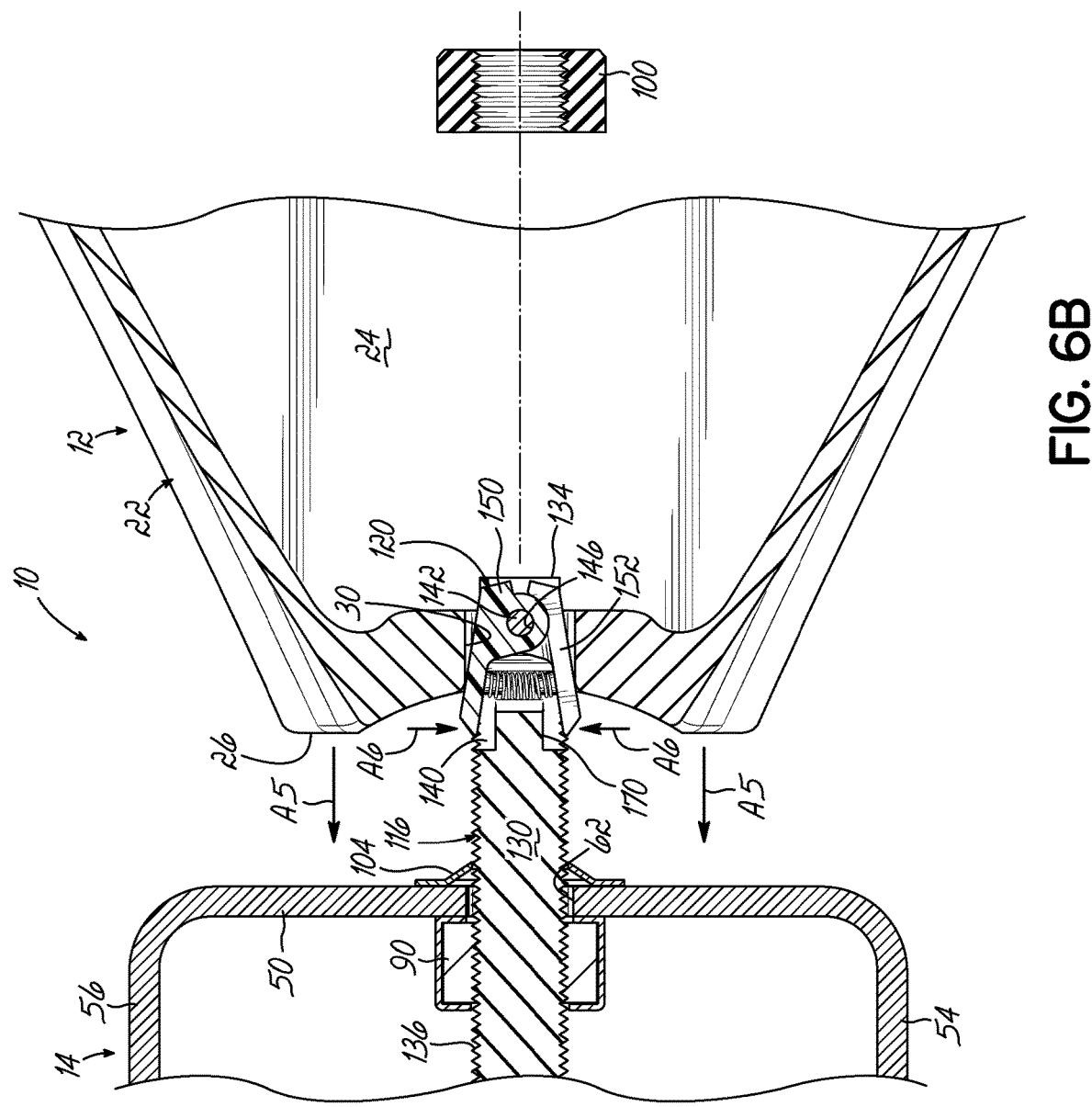
FIG. 6B is a cross sectional view similar to FIG. 6A, showing a second step of mounting the light fixture to the post.

With specific reference now to FIGS. 6A-6E, a method of mounting the fixture 12 to the post 14 with the support bolt 116 is described. Initially, the rear portion 26 of the fixture 12 may be advanced toward the front wall 50 of the post 14, as indicated by the arrows A4, with the first and second bolt apertures 30, 32 of the fixture 12 aligned with the support bolt 116 and second bolt 18 of the post 14, respectively, and the catch bar 120 of the support bolt 116 in the expanded state (FIG. 6A). As the lock washer 104 and first bolt aperture 30 are advanced over the support bolt 116, the catch bar 120 may be automatically compressed thereby without intervention by the installer. For example, as the fixture 12 is advanced toward the front wall 50 of the post 14 such that the support bolt 116 is received by the first bolt aperture 30, as indicated by the arrows A5, the periphery of the first bolt aperture 30 contacts the first and second arms 150, 152 of the catch bar 120 to compress the catch bar 120, as indicated by the arrows A6 (FIG. 6B). To that end, the force exerted by the periphery of the first bolt aperture 30 on the first and second arms 150, 152 may be sufficient to cause the catch bar 120 to move toward the compressed state, so that the catch bar 120 is radially within the support bolt 116 by virtue of the tips 154, 156 of the first and second arms 150, 152 spanning a distance less than or equal to the height of the elongate slot 140. Due to the catch bar 120 being radially within the support bolt 116, the catch bar 120 may avoid interfering with the advancement of the first bolt aperture 30 over the support bolt 116 toward the proximal end thereof.

Figure 6C:
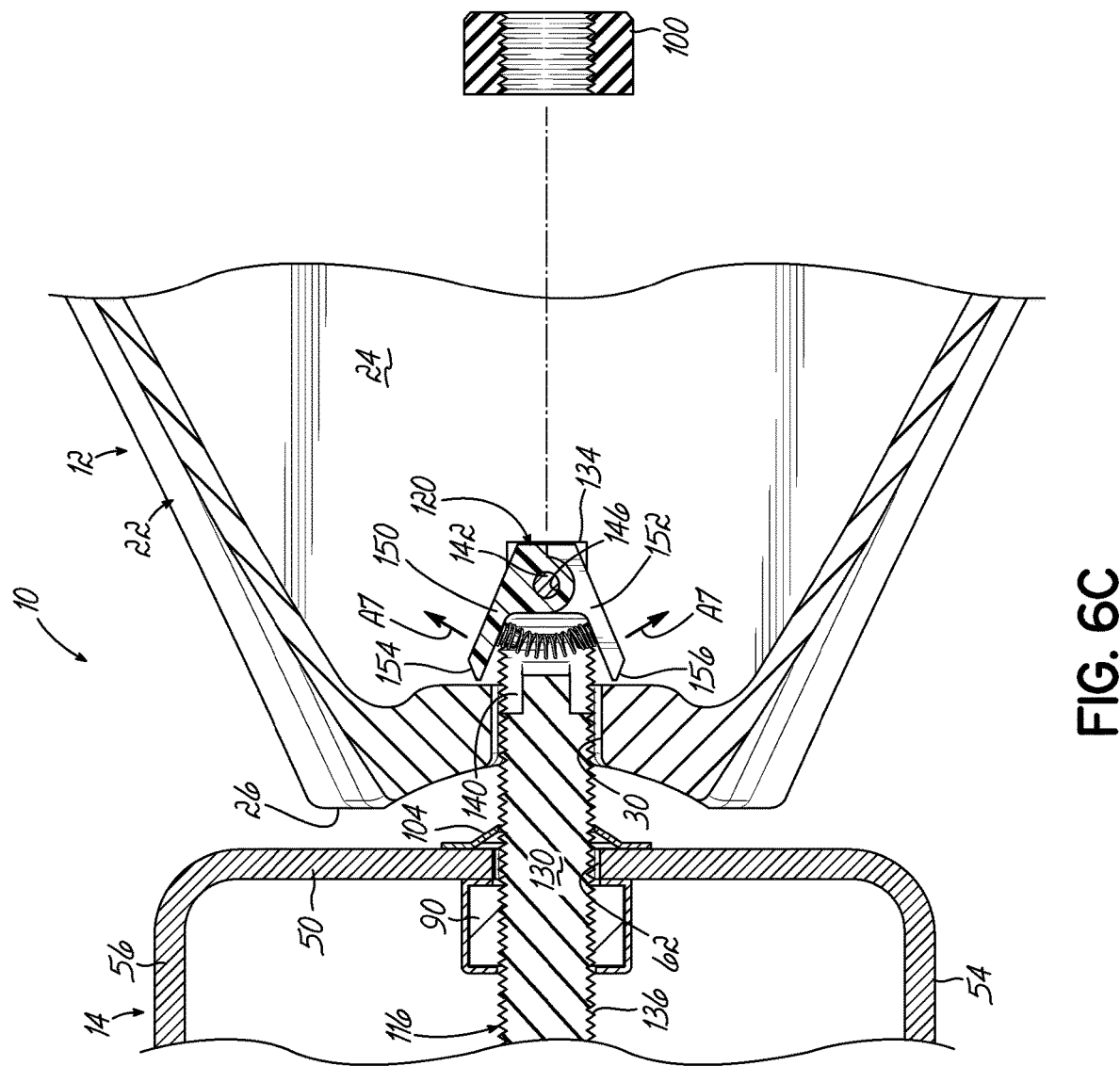
FIG. 6C is a cross sectional view similar to FIGS. 6A and 6B, showing a third step of mounting the light fixture to the post.

After the rear portion 26 of the fixture 12 has been sufficiently advanced along the bolts 116, 18 to clear the catch bar 120, the catch bar 120 automatically expands from the compressed state to the expanded state, wherein the catch bar 120 extends at least partially radially outwardly from the support bolt 116 (FIG. 6C). For example, the first and second arms 150, 152 may be biased outwardly by the spring 160 so as to pivot away from each other, as indicated by the arrows A7, upon removal of the force previously applied thereon by the periphery of the first bolt aperture 30. In the expanded state, the catch bar 120 extends radially outwardly from the support bolt 116 by virtue of the tips 154, 156 of the first and second arms 150, 152 spanning a distance greater than the height of the elongate slot 140. In addition, in the expanded state the catch bar 120 may provide a physical barrier to prevent the rear portion 26 from passing thereover and thereby retain the fixture 12 on the support bolt 116, by virtue of the tips 154, 156 of the first and second arms 150, 152 spanning a distance greater than the cross dimension of the first bolt aperture 30. It will be appreciated that by orienting the first and second arms 150, 152 to extend from the pin 142 generally toward the proximal end 132 of the support bolt 116 and biasing the arms 150, 152 outwardly, the periphery of the first bolt aperture 30 may be unable to accidentally compress the catch bar 120 from the expanded state to the compressed state from a proximal side thereof. For example, if the rear portion 26 were to unintentionally move toward the distal end 134 of the support bolt 116, the first and second tips 154, 156 would abut the interior surface of the rear portion 26 and halt such movement. In this manner, the catch bar 120 may prevent the fixture 12 from slipping off of the support bolt 116, and thus may relieve the installer of the need to manually support or steady the fixture 12 in place while simultaneously performing other tasks.

Figure 6D:
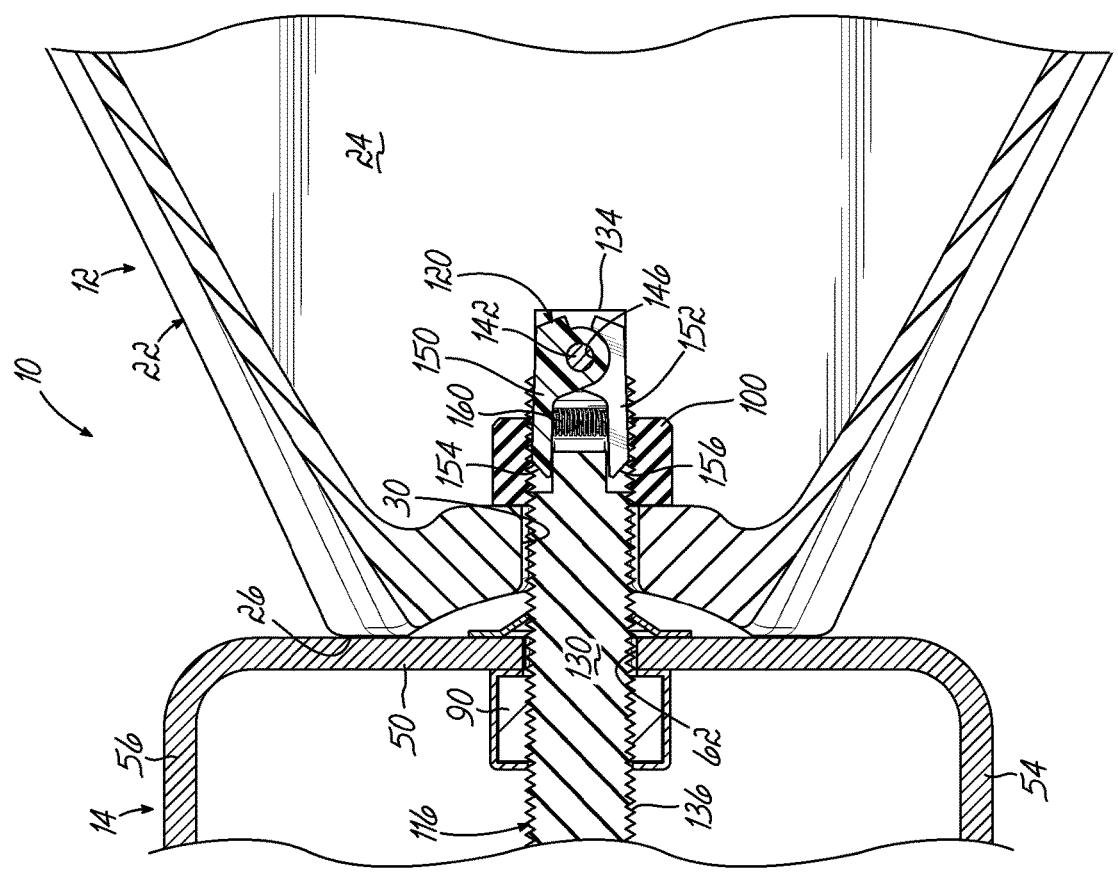
FIG. 6D is a cross sectional view similar to FIGS. 6A-6C, showing a fourth step of mounting the light fixture to the post.
Figure 6E:
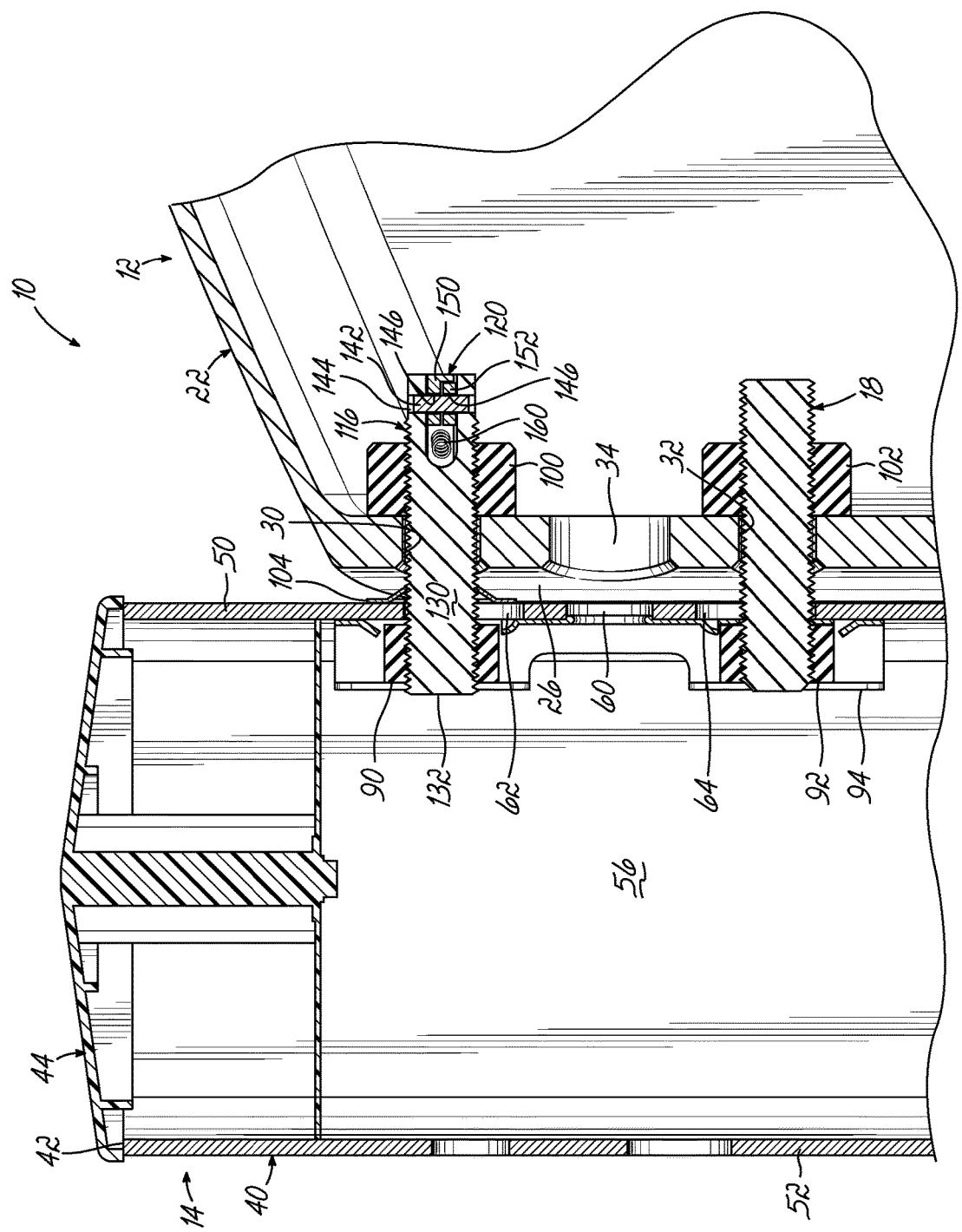
FIG. 6E is a cross sectional view of the assembly as shown in FIGS. 6A-6D, taken along a line perpendicular to section line 6A-6A, showing a fifth step of mounting the light fixture to the post.

With the catch bar 120 in the expanded state and the fixture 12 securely supported on the post 14 via the support bolt 116, the installer may freely use his or her hands to perform other intermediary tasks to complete a more permanent mounting of the fixture 12 to the post 14. For example, the installer may advance fasteners, such as the first and second nuts 100, 102, over the support bolt 116 and/or second bolt 18. In one embodiment, the first nut 100 may be advanced over the support bolt 116 prior to advancing the second nut 102 over the second bolt 18. In this regard, the first nut 100 may automatically compress the catch bar 120 from the expanded state to the compressed state while being advanced thereover, in a manner similar to the lock washer 104 and/or first bolt aperture 30. Thus, the first nut 100 may be secured to the support bolt 116 substantially simultaneously with the compression of the catch bar 120, so that the catch bar 120 may remain in the expanded state at least until the first nut 100 is secured to the support bolt 116 to thereby continuously securely retain the fixture 12 on the support bolt 116 (FIG. 6D). The first and second nuts 100, 102 may be tightened on the respective bolts 116, 18 to provide a rigid and secure attachment of the fixture 12 to the post 14 (FIG. 6E).

While the illustrated hands-free support bolts 16, 116 have been shown and described in the context of mounting a light fixture 12 to a post 14, it will be appreciated that support bolts 16, 116 in accordance with the present invention may be used for various other applications. For example, the support bolts 16, 116 may be used for mounting any type of fixture to any type of support. In addition, while each exemplary support bolt 16, 116 has been shown and described as being used in conjunction with a second (conventional) bolt 18, it will be appreciated that the support bolts 16, 116 may be used alone, with one or more additional support bolts 16, 116, or in any suitable combination.

While the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A mounting system comprising:
    a support including a threaded rod;
    a fixture including an aperture configured to be positioned over the threaded rod;
    a catch bar pivotably coupled to the threaded rod and moveable relative to the threaded rod between a first position wherein the catch bar permits the aperture to be positioned over the threaded rod, and a second position wherein each of a first portion of the catch bar and an opposite second portion of the catch bar extends at least partially radially outwardly in diametrically opposite directions from the threaded rod to thereby retain the fixture on the threaded rod; and
    a threaded nut threadably received over the threaded rod and the catch bar when the catch bar is in the first position and being configured to be threaded to a position along the threaded rod adjacent to the fixture to fixedly secure the fixture to the support.

2. The mounting system of claim 1, wherein the threaded rod includes an elongate slot housing the catch bar in at least the first position.

3. The mounting system of claim 1, wherein the threaded rod and the catch bar each include aligned pin apertures, and wherein a pin extends through the aligned pin apertures to couple the catch bar to the threaded rod.

4. The mounting system of claim 3, wherein the aligned pin apertures are positioned adjacent to a distal end of the threaded rod.

5. The mounting system of claim 1, wherein the catch bar is pivotable relative to the threaded rod between a first orientation wherein the catch bar extends parallel to an axis of the threaded rod and a second orientation wherein the catch bar extends perpendicular to the axis of the threaded rod.

6. A method of mounting a fixture to a support, the method comprising:
    providing the support with a threaded rod;
    providing the fixture with an aperture configured to be positioned over the threaded rod;
    pivotably coupling a catch bar to the threaded rod, the catch bar being moveable relative to the threaded rod between a first position wherein the catch bar permits the aperture to be positioned over the threaded rod, and a second position wherein each of a first portion of the catch bar and an opposite second portion of the catch bar extends at least partially radially outwardly in diametrically opposite directions from the threaded rod to thereby retain the fixture on the threaded rod;
    aligning the fixture with the support;
    advancing the aperture over the threaded rod;
    actuating the catch bar between the first position wherein the aperture is receivable over the threaded rod, and the second position wherein the fixture is retained against movement off of the threaded rod prior to advancing a threaded nut over the threaded rod;

receiving the threaded nut over the threaded rod and the catch bar when the catch bar is in the first position, the threaded nut configured to be threaded to a position along the threaded rod positioned adjacent to the fixture to fixedly secure the fixture to the support; and advancing the threaded nut over the threaded rod to secure the fixture to the support.

7. The method of claim 6, wherein actuating the catch bar comprises pivoting the catch bar of the threaded rod from the first position wherein the catch bar extends generally parallel to an axis of the threaded rod toward the second position wherein the catch bar extends generally perpendicular to the axis of the threaded rod.

8. The method of claim 7, further comprising:

pivoting the catch bar to the first position after the step of actuating the catch bar and prior to the step of advancing the threaded nut.

9. The method of claim 7, wherein pivoting the catch bar comprises manually pivoting the catch bar.

10. The method of claim 7, wherein advancing the threaded nut comprises advancing the threaded nut over the catch bar.

11. A mounting system comprising:

a support including a threaded rod;

a fixture including an aperture configured to be positioned over the threaded rod;

a catch bar pivotably coupled to the threaded rod and moveable relative to the threaded rod between a first position wherein the catch bar permits the aperture to be positioned over the threaded rod, and a second position wherein the catch bar extends at least partially radially outwardly in diametrically opposite directions from the threaded rod to thereby retain the fixture on the threaded rod; and a threaded nut threadably received over the threaded rod and the catch bar when the catch bar is in the first position and being configured to be threaded to a position along the threaded rod adjacent to the fixture to fixedly secure the fixture to the support, wherein the threaded nut prevents movement of the catch bar from the first position to the second position.

\* \* \* \* \*